United States Patent
Böse et al.

(10) Patent No.: US 8,123,971 B2
(45) Date of Patent: Feb. 28, 2012

(54) MAGNETORHEOLOGICAL ELASTOMERS (MRES) WITH POLYNORBORNENE AS A CARRIER MEDIUM, PROCESSES FOR PRODUCING SUCH ELASTOMER COMPOSITES AND THEIR USE

(75) Inventors: Holger Böse, Würzburg (DE); Rene' Röder, Würzburg (DE); Nikolaus Rennar, Unterpleichfeld (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 619 days.

(21) Appl. No.: 12/296,486

(22) PCT Filed: Apr. 10, 2007

(86) PCT No.: PCT/EP2007/003179
§ 371 (c)(1),
(2), (4) Date: Dec. 24, 2008

(87) PCT Pub. No.: WO2007/118639
PCT Pub. Date: Oct. 25, 2007

(65) Prior Publication Data
US 2009/0173908 A1  Jul. 9, 2009

(30) Foreign Application Priority Data
Apr. 10, 2006 (DE) .......................... 10 2006 016 773

(51) Int. Cl.
C08L 45/00 (2006.01)
C09K 3/00 (2006.01)
F16F 1/36 (2006.01)

(52) U.S. Cl. ...................... 252/62.54; 524/482; 525/210
(58) Field of Classification Search ................ 252/62.54; 524/482; 525/210
See application file for complete search history.

(56) References Cited

U.S. PATENT DOCUMENTS
5,300,355 A * 4/1994 Mifune et al. ................ 428/215
2005/0116194 A1 6/2005 Fuchs FOREIGN PATENT DOCUMENTS
| DE | 102004041649 A1 | | 3/2006 |
|---|---|---|---|
| JP | 63-39936 | * | 2/1988 |
| JP | 63039936 A | | 2/1988 |
| JP | 10-77381 | * | 3/1998 |
| WO | 03025056 A1 | | 3/2003 |
| WO | 2006024457 A1 | | 3/2006 |

OTHER PUBLICATIONS

International Search Report for Corresponding PCT Application PCT/EP2007/003179 (PCT/ISA/210/220) mailed Jun. 29, 2007.
International Preliminary Report on Patentability for Corresponding PCT Application PCT/EP2007/003179 (PCT/IPEA/409) mailed Aug. 4, 2008.
Written Opinion for Corresponding PCT Application PCT/EP2007/003179.
Database WPI Week 198813, Derwent Publications Ltd., London, GB An 1988-088470 XP002438260.
M. R. Jolly et al., "The Magnetoviscoelastic Response of Elastomer Composites Consisting of Ferrous Particles Embedded in a Polymer Matrix" Journal of Intelligent Material System and Structures, vol. 7-pp. 613-622 Nov. 1996.
J. M. Ginder, et al., "Magnetorheological Elastomers: Properties and Applications" SPIE vol. 3675, 131-138 Mar. 1999.
M. Lokander, et al., "Performance of Isotropic Magnetorheological Rubber Materials" Polymer Testing 22. pp. 245-251 (2003).
M. Lokander, et al., "Improving the Magnetorheological Effect in Isotropic Magnetorheological Rubber Materials" Polymer Testing 22. pp. 677-680 2003.
German Office Action for Priority Application DE 10 2006016773.2 dated: Dec. 11, 2006.

* cited by examiner

Primary Examiner — Carol M Koslow
(74) Attorney, Agent, or Firm — Timothy X. Gibson, Esq.; Gibson & Dernier LLP

(57) ABSTRACT

The invention relates to composites made of an elastic carrier medium comprising polynorbornene (PNR) and magnetisable particles which are polarized reversibly in a magnetic field. Thus the mechanical properties, such as e.g. storage modulus G' (describes the elastic behavior or the energy storage) and loss modulus G" (describes the viscous behavior or the energy dissipation), of such elastomer composites can be increased rapidly and reversibly within wide limits (up to approx. two orders of magnitude) as a function of an external magnetic field. Wide-ranging application possibilities are produced herefrom, e.g. for adaptive damping systems, in which the damping force can be adjusted via the strength of the magnetic field.

44 Claims, No Drawings

MAGNETORHEOLOGICAL ELASTOMERS (MRES) WITH POLYNORBORNENE AS A CARRIER MEDIUM, PROCESSES FOR PRODUCING SUCH ELASTOMER COMPOSITES AND THEIR USE

BACKGROUND

The invention relates to composites made of an elastic carrier medium consisting of polynorbornene (PNR) and magnetisable particles which are polarised reversibly in a magnetic field. Thus the mechanical properties, such as e.g. storage modulus G' (describes the elastic behaviour or the energy storage) and loss modulus G" (describes the viscous behaviour or the energy dissipation), of such elastomer composites can be increased rapidly and reversibly within wide limits (up to approx. two orders of magnitude) as a function of an external magnetic field. Wide-ranging application possibilities are produced herefrom, e.g. for adaptive damping systems, in which the damping force can be adjusted via the strength of the magnetic field.

Magnetically controllable elastomer composites, so-called magnetorheological elastomers (MRE), are already known in a general form. However magnetorheological fluids (MRF) in which the magnetisable particles are distributed in a carrier liquid are much more widespread. Because of the lack of chemical crosslinking, such materials do not however have a solid form but are liquid or irreversibly deformable as physically weakly crosslinked gels.

The possibility is likewise known to produce a chain-like orientation of the particles in an MRE during crosslinking by applying a magnetic field. Silicones have been used to date for this purpose and were used as pourable precursors. In addition, the use of other commercially widespread elastomers made of natural and synthetic rubber (e.g. nitrile rubber) are described in the literature; however only relatively small changes in the mechanical properties in the magnetic field were thus achieved. Also the use of different magnetisable particle materials in MRE was mentioned already in a general form.

The materials described in the state of the art can be found in the following literature sites: M. R. Jolly, J. D. Carlson, B. C. Munoz, T. A. Bullions, *J. Int. Mat. Syst. Struct.* 1996, 7, 613; J. M. Ginder, M. E. Nichols, L. D. Elie, J. L. Tardiff, *SPIE* 1999, Vol. 3675, 131; M. Lokander, B. Stenberg, *Pol. Test.* 2003, 245(22), 677.

SUMMARY OF THE INVENTION

It was therefore the object of the present invention to avoid the disadvantages known in the state of the art.

This object is achieved according to the invention by the composite materials having the features described herein and the method for production thereof described herein.

According to the invention, composite materials, comprising magnetisable particles in an elastomer matrix containing at least one polynorbornene, are provided.

DETAILED DESCRIPTION OF THE INVENTION

The basic rigidity of the elastomer composite without an external magnetic field can be influenced advantageously by the chosen polynorbornene, the degree and type of chemical crosslinking and also the magnetisable particles.

Possible basic materials for the production of the elastomer composite according to the invention are fundamentally all polynorbornene types (table 1) and also all magnetisable particle materials. Polynorbornene is the homopolymer of the monomer component 2-norbornene. This monomer can be synthesised, on the one hand, via a ring-opening metathesis mechanism by means of special transition metal catalysts. Above all, polymers with the structure 1 and 2 are thereby obtained. On the other hand, polynorbornene can be produced by vinyl polymerisation with the main structures 3 and 4.

TABLE 1

Different polynorbornene types

| Structure 1 | cis-PNR | 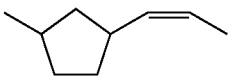 |
| Structure 2 | trans-PNR | 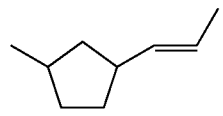 |
| Structure 3 | 2,3-PNR | 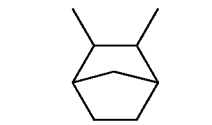 |
| Structure 4 | 2,7-PNR | 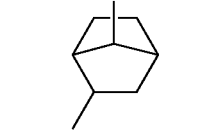 |

A trans-polynorbornene (PNR) of structure 2 (table 1) is used preferably, which is amorphous at room temperature, has an unusually high molar mass ($>3 \cdot 10^6$ g/mol) and is characterised by a glass transition temperature $T_g \approx 37°$ C. Furthermore, the pure polymer has a porous structure which facilitates absorption of large quantities of plasticiser. Thus the glass temperature is lowered by the addition of approx. 250 parts by mass of a paraffinic processing oil (relative to 100 parts by mass polymer) to $T_g < -50°$ C. and the material becomes rubber-like.

It is preferred that the magnetisable particles consist of soft magnetic materials. Soft magnetic magnetisable particle materials are preferably all ferro- and ferrimagnetic materials, in particular iron powder (carbonyl iron powder and differently produced iron powders), cobalt, nickel, vanadium, tungsten, copper, manganese and alloys thereof and also iron oxides (e.g. magnetite) and ferrite.

It is also possible to choose as magnetisable particles those made of hard magnetic materials. These are then selected preferably from the group consisting of AlNiCo, AlNiCoCu, CuNiCo, CoFe, CoFeV, FeMo, FeMoCo, CuNiFe, CoPt, FePt, SmCo, CeCo, NdFeB and hard ferrites, in particular barium- and strontium ferrites.

It has likewise proved to be advantageous to use particles of metallic glasses, metal oxides, garnets, metal nitrides, metal carbides and also mixtures of the mentioned materials.

The effect of the magnetisable particles on the basic rigidity of the elastomer composite depends upon the volume concentration but also upon the type of particles, the particle size distribution and the particle shape.

The magnetisable particles thereby preferably have a size which is between 5 nm and 10 mm, particularly preferred between 10 nm and 1 mm. The volume concentration of the particles relative to the total volume of the composite material can thereby vary, in a preferred embodiment, between 1 and 70%, particularly preferred between 10 and 50%.

The distribution of the magnetisable particles can be effected both isotropically and anisotropically in accordance with the field of application of the composite materials.

In addition, any further additives can be present in the composite materials, for example fillers, ageing-protecting agents, dispersion agents, crosslinking agents and/or plasticisers. A crucial influencing possibility arises in addition by the use of synthetic processing oils or mineral oil plasticisers. The initial hardness of the composite can be reduced by using oils as plasticiser in order to enable change in the mechanical rigidity within a wide range. A particular advantage of polynorbornene as carrier medium of the magnetorheological elastomer resides in the fact that contents of plasticiser of above 1,000 parts by mass (relative to 100 parts by mass polymer) can be introduced. This offers the possibility of producing extremely soft elastomer composites, as a result of which the mechanical characteristic values can be increased by the factor >50. For example with a dynamic-mechanical measurement at an excitation frequency of 10 Hz and a shear amplitude of 1%, an increase in the storage modulus G' by the factor of approx. 80 was thus established.

Furthermore, influence can be exerted on the basic rigidity of the elastomer via the degree of crosslinking of the polynorbornene matrix. The crosslinking agents to be added are thereby preferably organic or inorganic peroxides and/or sulphur accelerator systems.

It proves advantageous if the hardness of the elastomer matrix is adjusted by the additives such that it has no more than 20 Shore A, preferably no more than 10 Shore A.

The rigidity modulus is suitable for further characterisation of the elastomer matrix. This should, in an advantageous embodiment of the invention, be no more than 500 kPa, preferably no more than 250 kPa, at a frequency of 10 Hz and a deformation of 1%.

The modulus of elasticity (E-modulus) is likewise suitable as information as to the consistency of the elastomer matrix. Advantageously, the modulus of elasticity should not have a value greater than 1,500 kPa, in particular a value not greater than 750 kPa.

Ageing and heat resistance up to at least 100° C. are provided for the novel MRE and can be improved further by additional additives. Good cold behaviour and resistance to polar liquid media, such as alcohol, diluted acids and caustic solutions, are characteristic of the magnetorheological elastomer composites according to the invention. A particular advantage of the novel elastomer composites relative to previously known materials resides in the high breaking elongation of approx. 500% relative to maximum elongations of ≦100% for corresponding comparative materials. By incorporating large quantities of plasticiser, a very low basic hardness of the composite can be adjusted if required, as a result of which particularly high increase factors in the mechanical characteristic values, such as e.g. the rigidity modulus in the magnetic field, are made possible.

Furthermore, it must be emphasised that PNR elastomers have an almost constant damping over a wide temperature range. As a result, adaptive damping systems based on the present invention become extensively temperature-insensitive but reveal the desired magnetic field-sensitive property change. It was thus established that both the storage modulus G' and the loss modulus G" in the case of the elastomer composites according to the invention are influenced by the magnetic field. The same applies also to the loss factor as ratio of loss modulus and storage modulus.

Thus technically significant possibilities for controlled oscillation damping or oscillation isolation are opened up.

A further interesting property of the magnetorheological elastomer composite resides in the occurrence of a shape memory effect. An object formed from the composite material can be deformed in the magnetic field by the effect of external forces. The new shape is maintained as long as the magnetic field is in operation. After switching off the field, the object returns however to its original shape. This effect can be attributed to the fact that, in the magnetic field, the magnetic forces between the magnetisable particles dominate, whilst the behaviour without a magnetic field is determined by the elastic forces of the elastomer. However it is a prerequisite of this behaviour that the elastic restoring forces are not too strong and enable movability of the magnetisable particles. A soft elastomer matrix is therefore particularly advantageous.

The magnetisable particles can be distributed homogeneously in the rubber matrix directly by mechanical mixing of polymer and magnetisable powders by means of suitable devices (isotropic material). However they can also be dispersed very finely, possibly in the form of magnetisable nanoparticles, indirectly by mixing the rubber with a precursor of the magnetisable component and a subsequent physical-chemical reaction in situ in the rubber matrix. Apart from the production of such isotropic materials, it is in addition possible to impress upon the filler particles a non-uniform, directed, chain-like structure along the magnetic field lines (anisotropic material) even before the crosslinking by applying an external magnetic field. The impressed structure can be varied within wide limits by the strength of the magnetic field prevailing during the crosslinking process. The crosslinking can be effected both by sulphur accelerator systems and by the use of peroxides.

For the production of polynorbornene composites, two methods according to the invention are suitable, namely the dissolving method or production of the mixture with a mixing unit, e.g. on the roller mill or in the internal mixer.

Dissolving Method:

The plasticiser-free or even oil-extended polymer is dissolved in an organic solvent selected from the group comprising aliphatic hydrocarbons, in particular n-hexane, n-heptane, n-octane or n-nonane, cyclic hydrocarbons, in particular cyclohexane, aromatic hydrocarbons, in particular toluene, ethers and also mixtures hereof and is mixed with all the additives, such as e.g. fillers, ageing-protecting agents, dispersion agents, crosslinking agents, plasticisers, processing agents, adhesives, antistatic agents and/or retarders. Subsequently the solvent can be removed in vacuum and/or by heating, the homogeneous plastic or pourable mass transferred into sealable sample moulds and crosslinked at a fairly high temperature in the range of 100° C. to 200° C., preferably in the range of 140° C. to 180° C. The crosslinking can be effected with simultaneous application of a magnetic field in order to achieve an anisotropic arrangement of the magnetisable particles.

Production of the Mixture on the Roller Mill or in the Internal Mixer:

Polymer, plasticiser, filler, crosslinking chemicals and possibly further additives are mixed together intensively according to a currently normal method by means of suitable mixing units (roller mill, internal mixer); subsequently, shaping and crosslinking are effected at a fairly high temperature. By applying a magnetic field, an anisotropic distribution of the magnetisable particles can be achieved.

Possible applications of the invention reside in damping systems in which the degree of damping or oscillation isolation can be changed temporarily by a variable magnetic field.

For example, adaptive impact and oscillation dampers, controllable brakes, couplings and sport or training apparatus are devices which may include the composite material as disclosed herein.

In addition, haptic systems can be achieved with magnetically controllable elastomer composites based on polynorbornene, in which the rigidity of a surface is changed perceptibly. In accordance with one or more embodiments, a system including the composite material disclosed herein may be provided for producing and/or presenting haptic information such as forces, torques, characters, computer-simulated objects, sensor signals and pictures.

As a result of the high deformability of the novel elastomer composites, artificial muscles in addition are conceivable, the extension or contraction of which is controlled magnetically.

Further possibilities for application reside in actuators or safety switches in which a movement is initiated using the shape memory effect by changing the magnetic field.

The possibility likewise exists of using the magnetorheological composite materials in safety systems.

Furthermore, the possibility exists of using soft magnetically controllable elastomer composites by constructing a magnetic circuit with inclusion of an electromagnetic and a permanent magnet. By means of the selection of permanent magnet, increased basic rigidity of the elastomer composite can be adjusted. An additional electromagnet can reinforce or weaken this magnetic field according to the direction of the generated current and hence either increase or reduce the rigidity of the elastomer composite. In this way, for example the hardness of the material in the state in which no current flows through the coil in an oscillation-damping system can be established. In accordance with one embodiment, a device is provided for adjustment of the hardness of a material in a state in which no current flows through a coil including the composite material disclosed herein together with a magnetic circuit which can further contain permanent magnets apart from electromagnets.

EXAMPLE 100 parts by weight of polynorbornene rubber (Norsorex) are mixed with 733 parts by weight of iron powder (Höganäs ASC 300, average particle size 41 μm) and are homogenised on a laboratory roller mill for 20 minutes. Subsequently, 132 parts by weight of a napthenic oil (Enerthene) are added as plasticiser and in addition 2.13 parts by weight of dicumyl peroxide as crosslinking agent and likewise are homogenised on the roller mill. After a further 20 minutes homogenisation, the hence obtained master batch is removed and further processed after a cooling time of at least one hour. For production of a test body, a corresponding quantity of the master batch is introduced into the mould of the compression tool and is crosslinked for 3 hours in a pressure-tight manner at a temperature of 150° C.

The viscoelastic properties of the magnetorheological elastomer samples were examined in a rotational rheometer MCR 300 of the firm Paar-Physica in a magnetic field of variable power. The disc-like sample with 20 mm diameter is thereby situated between two parallel, horizontally disposed sheets, the upper sheet of which exerts a prescribed rotational oscillation and hence subjects the sample to shear deformation in an oscillating manner. The magnetic field passes through the sample vertically, i.e. perpendicular to the plane of the sheet. The amplitude $\gamma_0$ of the shear deformation was kept constant at $\gamma_0=0.01$ (corresponding to 1%). The frequency of the oscillation was 10 Hz, the temperature was 25° C. During the measurement, the current strength in the magnetic field-exciting coil was gradually increased and hence the magnetic field strength was increased.

During the measurement, apart from the shear deformation, also the shear stress and the phase shift between both values are recorded by the measuring device. From the measuring values, the storage modulus G' (real part of the complex rigidity modulus) and the loss modulus G" (imaginary part of the complex rigidity modulus) are determined. The storage modulus describes the elastic behaviour of the material (storage of mechanical energy), whilst the loss module describes the viscous behaviour of the material (dissipation of mechanical energy and conversion into heat).

The measurements reveal a very high increase in the storage modulus G' and in the loss modulus G" with the magnetic flux density as a measure of the magnetic field strength.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A composite material, comprising magnetisable particles in an elastomer matrix which comprises at least one polynorbornene homopolymer, which is at least partially crosslinked, and a plasticiser, the elastomer matrix having a hardness of ≦20 Shore A.

2. A composite material according to claim 1 wherein the at least one polynorbornene has a porous structure.

3. A composite material according to claim 1 wherein the at least one polynorbornene has a molecular mass of at least $3 \cdot 10^6$ g/mol.

4. A composite material according to claim 1 wherein the at least one polynorbornene is trans-polynorbornene.

5. A composite material according to claim 1 wherein the magnetisable particles are soft magnetic.

6. A composite material according to claim 5 wherein the soft magnetic magnetisable particles consist of ferro- and/or ferrimagnetic materials.

7. A composite material according to claim 1 wherein the magnetisable materials are selected from the group consisting of metals, metallic glasses, metal oxides, ferrites, garnets, metal nitrides, metal carbides and mixtures hereof.

8. A composite material according to claim 7 wherein the metals are selected from the group consisting of iron, cobalt, nickel, vanadium, tungsten, copper, manganese and also alloys thereof and mixtures hereof.

9. A composite material according to claim 1 wherein the magnetisable particles are hard magnetic.

10. A composite material according to claim 9 wherein the hard magnetic magnetisable particles are selected from the group consisting of AlNiCo, AlNiCoCu, CuNiCo, CoFe, CoFeV, FeMo, FeMoCo, CuNiFe, CoPt, FePt, SmCo, CeCo, NdFeB and hard ferrites.

11. A composite material according to claim 1 wherein the average particle size of the magnetisable particles extends from 5 nm to 10 mm.

12. A composite material according to claim 1 wherein the average particle size of the magnetisable particles extends from 10 nm to 1 mm.

13. A composite material according to claim 1 wherein the volume content of the particles makes up 1 to 70% of the total volume.

14. A composite material according to claim 13 wherein the volume content of the particles makes up 10 to 50% of the total volume.

15. A composite material according to claim 1 wherein the magnetisable particles are distributed isotropically in the elastomer matrix.

16. A composite material according to claim 1 wherein the magnetisable particles are distributed anisotropically in the elastomer matrix.

17. A composite material according to claim 1 wherein further additives are present.

18. A composite material according to claim 17 wherein the additives are selected from the group consisting of fillers, ageing-protecting agents, dispersion agents, crosslinking agents, processing agents, adhesives, antistatic agents and/or retarders.

19. A composite material according to claim 18 wherein the processing agents are selected from the group consisting of aromatic, napthenic and/or paraffinic mineral oils and/or synthetic oils.

20. A composite material according to claim 18 wherein the crosslinking agents are selected from the group consisting of organic or inorganic peroxides and/or sulphur accelerator systems.

21. A composite material according to claim 1 wherein the elastomer matrix has a hardness of $\leq 10$ Shore A.

22. A composite material according to claim 1 wherein the elastomer matrix has a rigidity modulus $\leq 500$ kPa at 10 Hz and 1% shear deformation.

23. A composite material according to claim 22 wherein the elastomer matrix has a rigidity modulus $\leq 250$ kPa at 10 Hz and 1% shear deformation.

24. A composite material according to claim 1 wherein the elastomer matrix has an E-modulus $\leq 1,500$ kPa.

25. A composite material according to claim 24 wherein the elastomer matrix has an E-modulus $\leq 750$ kPa.

26. A method for the production of magnetorheological composite materials according to claim 1 in which the magnetisable particles and possibly further additives are mixed into the elastomer matrix with a mixing unit.

27. The method according to claim 26 wherein the mixing-in is effected with a roller mill or an internal mixer.

28. The method for the production of magnetorheological composite materials according to claim 1 in which the polynorbornene homopolymer is dissolved in an organic solvent, the magnetisable particles and possibly further additives are mixed into the solution.

29. The method according to claim 28 wherein the organic solvent is selected from the group consisting of aliphatic hydrocarbons, cyclic hydrocarbons, aromatic hydrocarbons, and mixtures hereof.

30. The method according to claim 28 wherein, after incorporation of the magnetisable particles and possibly further additives, the organic solvent is removed in vacuum and/or by heating.

31. The method according to claim 26 wherein crosslinking of the elastomer matrix is implemented in sealable sample moulds.

32. The method according to claim 26 wherein the polymer matrix is crosslinked at a temperature in the range of 100° C. to 200° C.

33. The method according to claim 32 wherein the polymer matrix is crosslinked at a temperature in the range of 140° C. to 180° C.

34. The method according to claim 27 wherein the magnetisable particles in the elastomer matrix are distributed isotropically or are disposed anisotropically.

35. The method according to claim 27 wherein the magnetisable particles are mixed isotropically into the elastomer matrix and are disposed anisotropically in the elastomer matrix.

36. The method according to claim 35, wherein the anisotropic arrangement of the magnetisable particles is achieved by applying an external magnetic field before and/or during the crosslinking.

37. In magnetorheological elastomer applications, the improvement comprises using the composite material according to claim 1 as the magnetorheological elastomer.

38. A device selected from the group consisting of adaptive impact and oscillation dampers, controllable brakes, couplings and sport or training apparatus comprising the composite material according to claim 1.

39. A system for producing and/or presenting haptic information, selected from the group consisting of forces, torques, characters, computer-simulated objects, sensor signals and pictures comprising the composite material according to claim 1.

40. An artificial muscle comprising the composite material according to claim 1.

41. A device selected from an actuator and safety switch comprising the composite material according to claim 1.

42. A device for adjustment of the hardness of a material in a state in which no current flows through a coil comprising the composite material according to claim 1 together with a magnetic circuit which can further contain permanent magnets apart from electromagnets.

43. A composite material according to claim 9 wherein the hard magnetic magnetisable particles are selected from the group consisting of barium ferrites and strontium ferrites.

44. A method according to claim 28 wherein the organic solvent is selected from the group consisting of n-hexane, n-heptane, n-octane, n-nonane, cyclohexane, toluene, ethers and mixtures hereof.

* * * * *